(12) United States Patent
Morgan

(10) Patent No.: US 11,785,936 B1
(45) Date of Patent: Oct. 17, 2023

(54) APPARATUS AND METHOD FOR CARRYING HARVESTED GAME ANIMALS

(71) Applicant: David Gregory Morgan, Paris, IL (US)

(72) Inventor: David Gregory Morgan, Paris, IL (US)

( * ) Notice: Subject to any disclaimer, the term of this patent is extended or adjusted under 35 U.S.C. 154(b) by 0 days.

(21) Appl. No.: 17/549,097

(22) Filed: Dec. 13, 2021

Related U.S. Application Data

(60) Provisional application No. 63/125,467, filed on Dec. 15, 2020.

(51) Int. Cl.
*A01M 31/00* (2006.01)
*F41C 27/00* (2006.01)

(52) U.S. Cl.
CPC ........... *A01M 31/006* (2013.01); *F41C 27/00* (2013.01)

(58) Field of Classification Search
CPC .............................. F41C 27/00; A01M 31/006
See application file for complete search history.

(56) References Cited

U.S. PATENT DOCUMENTS

| | | | | |
|---|---|---|---|---|
| 3,096,010 A | * | 7/1963 | Rasmussen | A01M 31/006 224/921 |
| 3,243,909 A | * | 4/1966 | Kotikov | F42B 30/06 42/105 |
| 3,708,901 A | * | 1/1973 | Wolter | F41A 17/44 42/70.11 |
| 4,706,858 A | * | 11/1987 | Whatley | A01M 31/00 224/184 |
| 5,044,106 A | * | 9/1991 | Slocum | F41A 17/44 42/70.11 |
| 5,592,770 A | * | 1/1997 | Gudgel | F41C 27/00 42/105 |
| 7,441,363 B1 | * | 10/2008 | Black | F41A 29/00 15/104.03 |
| 2016/0223289 A1 | * | 8/2016 | Bennett | F41C 33/002 |

\* cited by examiner

*Primary Examiner* — Derek J Battisti

(74) *Attorney, Agent, or Firm* — Technology Law, PLLC; Robert C. Corbett

(57) ABSTRACT

An apparatus for carrying harvested game animals is includes a rod that is sufficiently sized and shaped to be insertable into the bore of a firearm barrel. A stopper portion of the apparatus is operatively connected to the rod and has a width that is wider than the bore to thereby limit insertion of the rod into the bore. A cord is mounted to the rod and stopper such that, when the rod is inside the bore of the barrel, the cord is outside the bore. A method of using the apparatus includes securing the cord to a harvested animal, inserting the rod into the bore of a firearm, and supporting the firearm on a shoulder to facilitate carrying the animal.

4 Claims, 3 Drawing Sheets

US 11,785,936 B1

APPARATUS AND METHOD FOR CARRYING HARVESTED GAME ANIMALS

CROSS-REFERENCE TO RELATED APPLICATION

This application claims the benefit of U.S. Provisional Patent Application No. 63/125,467, filed Dec. 15, 2020, and which is hereby incorporated by reference in its entirety.

TECHNICAL FIELD

This disclosure relates to devices for carrying harvested animals.

BACKGROUND OF THE INVENTION

Hunters typically harvest game animals in their natural habitat, which is often a significant distance from the hunter's home or vehicle. Accordingly, a harvested game animal must be transported, sometimes through difficult terrain. Typically, a hunter will carry a harvested game animal. However, harvested animals are often heavy and, due to the weight distribution of many animals, cumbersome, which places a significant burden on hunters, especially those with any physical disabilities. The weight and shape may result in the animal being in contact with the hunter's clothing while the hunter is carrying it, which may result in dirt and blood staining the hunter's clothes and possibly being transferred to the hunter's vehicle seat.

SUMMARY

An apparatus for carrying harvested game animals is provided herein. The apparatus is usable use with a firearm having a barrel defining a bore and a muzzle. The apparatus comprises a rod that is sufficiently sized and shaped to be insertable into the bore of the barrel via the muzzle. A stopper portion is operatively connected to the rod and has a width that is wider than the bore to prevent the insertion of the stopper portion into the bore. A cord is mounted to the rod and stopper such that, when the rod is inside the bore of the barrel, the cord is outside the bore.

The cord is attachable to a harvested game animal. When the rod is within the barrel, the apparatus connects the harvested animal to the end of the barrel, which facilitates the carrying of the animal. More specifically, the firearm may be supported by the shoulder of the hunter, and thus the hunter does not have to use arm and hand muscles to support the entire weight of the animal. Furthermore, the firearm holds the animal a distance from the body of the person carrying the firearm while also reducing the amount of arm and hand muscles to lift and hold the animal while walking. The apparatus thus greatly facilitates the ease of transporting a harvested game animal.

Moreover, the apparatus is small and easily fits within a pocket, thereby providing a cost-effective and lightweight solution to the problem of carrying game animals. The apparatus converts the firearm, which a hunter already uses, into an effective means of carrying a heavy load.

A corresponding method of use is provided.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
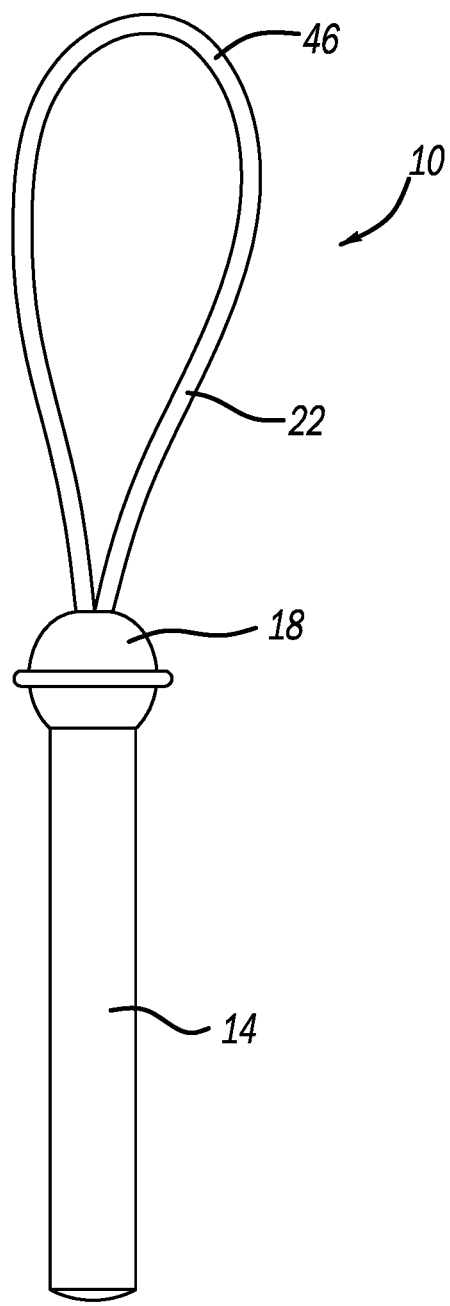
FIG. 1 is a schematic, side view of an apparatus in accordance with the claimed invention.
Figure 2:
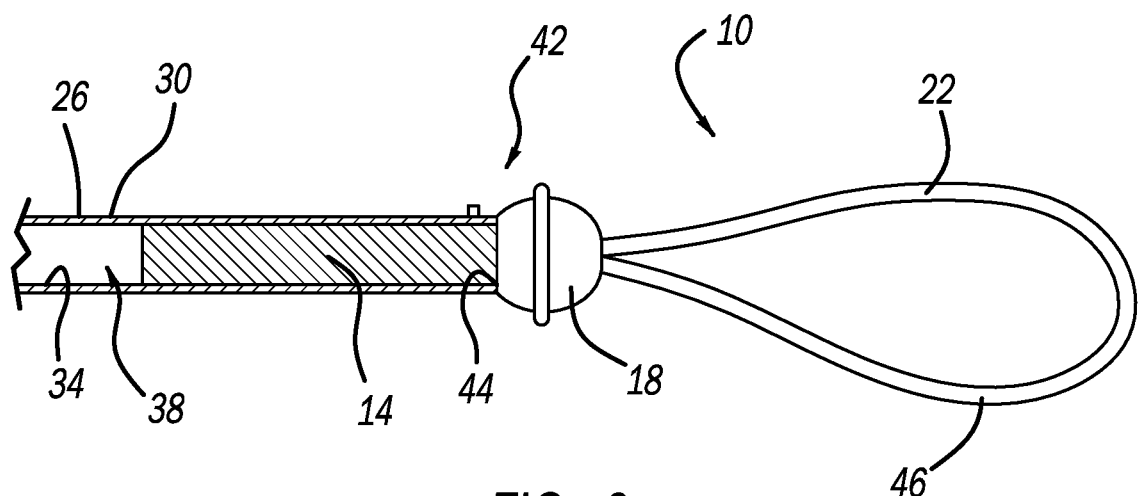
FIG. 2 is a schematic, cross-sectional, side view of a firearm barrel with the apparatus of FIG. 1 partially inserted therein.

Referring to FIGS. 1 and 2, wherein like reference numbers refer to like components, an apparatus 10 for carrying harvested game animals is schematically depicted. The apparatus 10 includes a rod 14, a stopper portion 18, and a cord 22. The apparatus 10 is usable with a firearm 26 having a barrel 30. As understood by those skilled in the art, the inner surface 34 of the barrel 30 defines a bore 38, i.e., a substantially cylindrical passageway or space 38 through which the shot, bullet, slug, etc. travels prior to exiting the barrel 30 at the muzzle 42. As used herein, a "substantially cylindrical space" includes deviations from perfectly cylindrical for purposes such as a choke on a shotgun. The rod 14 is sized and shaped to be insertable into the bore 38 of the barrel 30 via the opening 44 at the muzzle 42, as shown in FIG. 2.

More specifically, the rod 14 in the embodiment depicted is cylindrical and has a diameter slightly less than the diameter of the bore 38. The rod 14 is preferably formed of a substantially rigid material, such as, but not limited to, wood, hard polymers, various metals, etc.

The stopper portion 18 is operatively connected to one end of the rod 14. The stopper portion 18 has a width that is wider than the bore 38. Accordingly, the stopper portion 18 is prevented from entering the bore 38 by physical part interference with the muzzle 42, as shown in FIG. 2, and thus limits the travel of the rod 18 into the bore 38. More specifically, as shown in FIG. 2, the entire length of the rod 14 is within the bore 38 of the barrel, but cannot slide further into the barrel once the stopper portion 18 contacts the muzzle 42.

In the embodiment depicted, the rod 14 and the stopper portion 18 are separate pieces that are connected to one another such as via a threaded fastener, adhesive bonding, etc. However, and within the scope of the claimed invention, the rod 14 and the stopper portion 18 may also be parts of a single piece of material.

The cord 22 is mounted to the stopper portion 18 on the opposite side of the stopper portion 18 from the rod 14, and thus the stopper portion 18 also prevents the cord 22 from entering the barrel 30. The cord 22 in the embodiment depicted forms a loop 46 to facilitate engaging the cord 22 with a harvested game animal. However, the cord 22 may, within the scope of the claimed invention, have any form that enables use as described herein. For example, in one alternative embodiment (not shown), the apparatus 10 may have one or more cords that are mounted to the stopper portion 18 with free ends for tying to a harvested game animal. In one embodiment, the cord 22 is the type commonly referred to as "parachute cord." In another embodiment, the cord 22 may comprise an elastomer. However, any cord composition that enables the use of the apparatus as described herein may be employed within the scope of the claimed invention.

Figure 3:
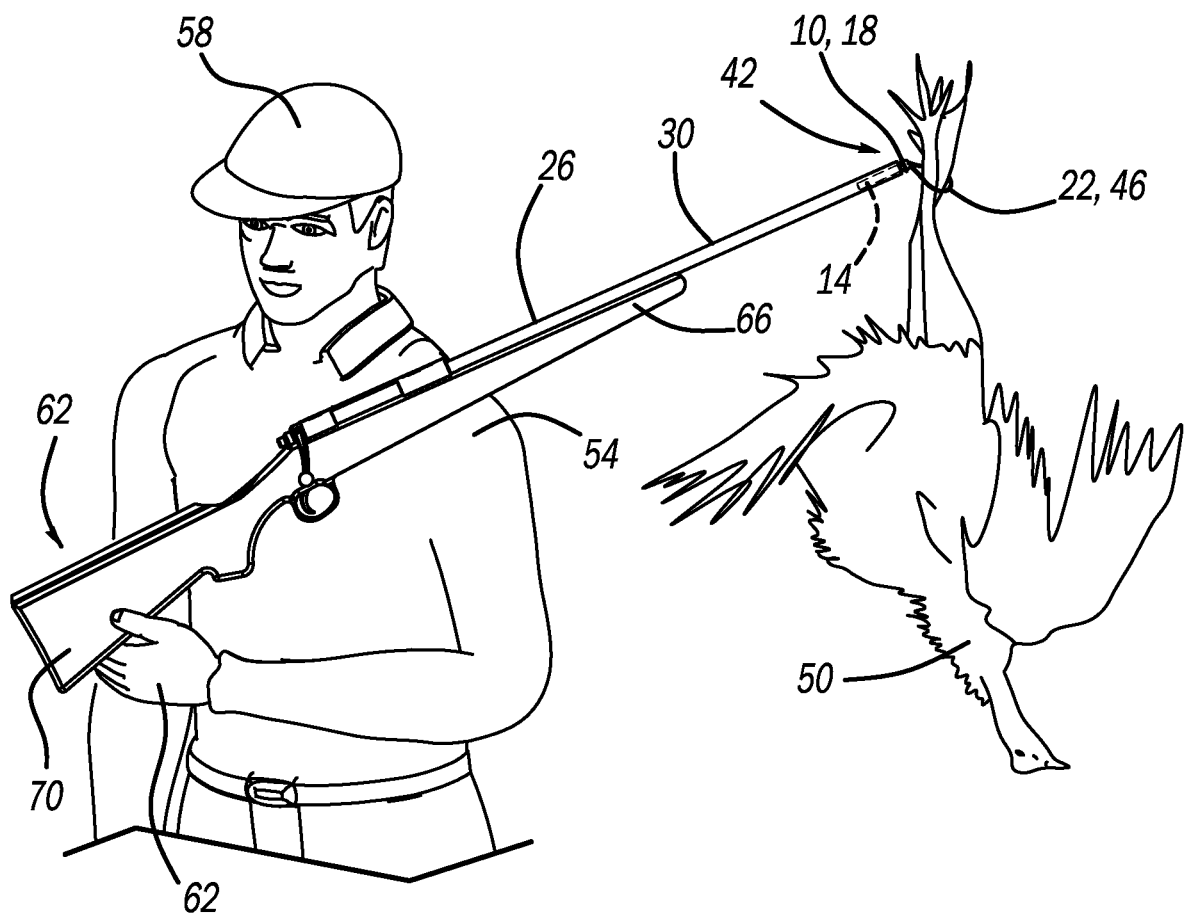
FIG. 3 is a schematic, side view of the apparatus in a first mode of use.
Figure 4:
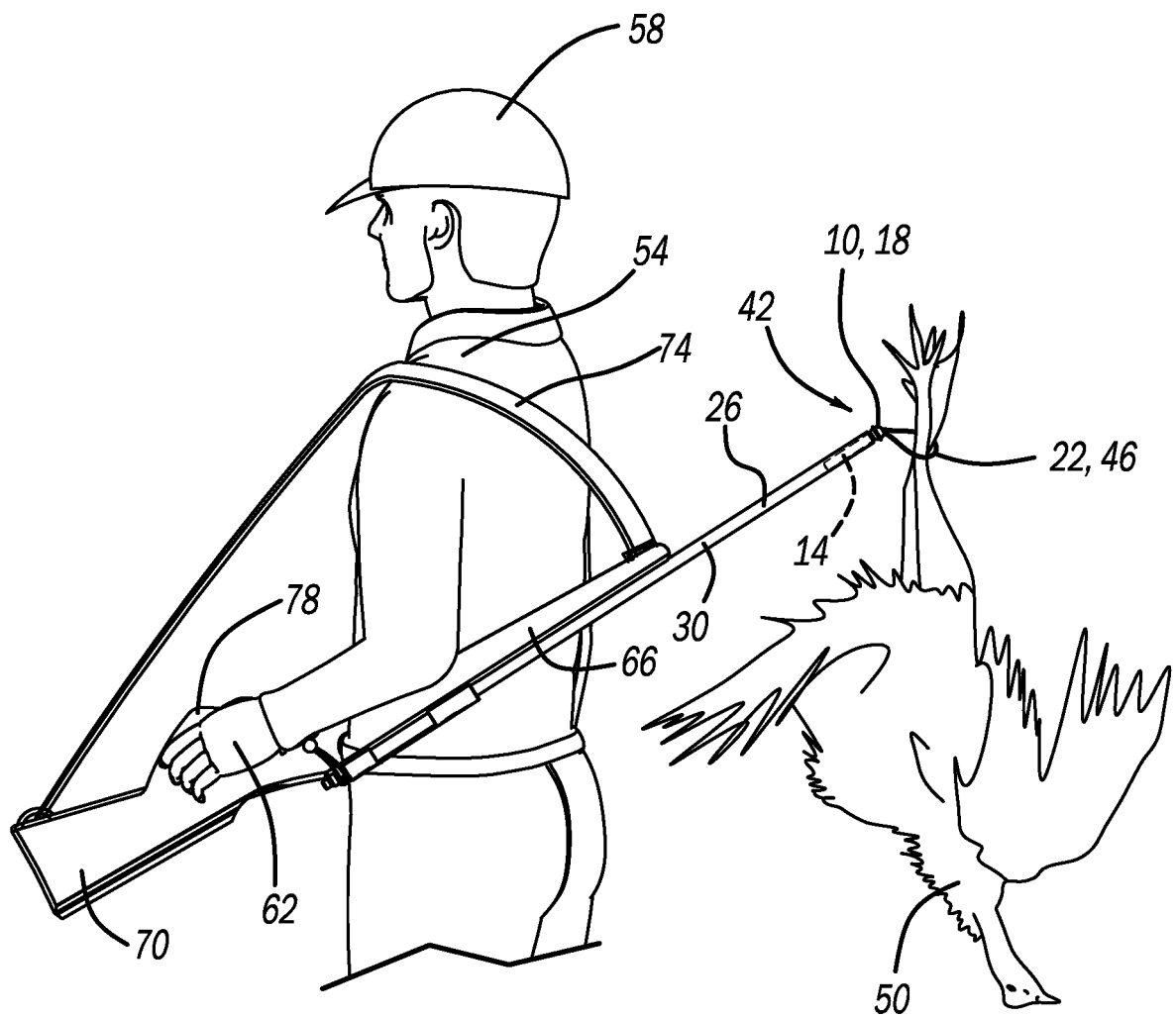
FIG. 4 is a schematic, side view of the apparatus in a second mode of use.

FIGS. 3 and 4, wherein like reference numbers refer to like components from FIGS. 1 and 2, schematically depict methods of using the apparatus 10. Referring to FIGS. 1-4, the method includes possessing the firearm 26 having a barrel 30 defining a bore 38 and a muzzle 42. The method also includes possessing the apparatus 10 having a rod 14 being sufficiently sized and shaped to be insertable into the bore 38 of the barrel 30 via the muzzle 42, a stopper portion 18 operatively connected to the rod 14 and having a width that is wider than the bore 38, and a cord 22 being mounted to the rod 14 and stopper portion 18 such that, when the rod 14 is inside the bore 38 of the barrel 30, the cord 22 is outside the bore 38, as shown in FIG. 2.

The method also includes securing, i.e., attaching or fastening, a harvested animal 50 to the apparatus 10 via the cord 22 as shown in FIGS. 3 and 4. Securing the animal 50 to the apparatus 10 via the cord 22 may include, for example, tying the cord 22 around the legs of the animal 50 or looping the cord 22 around the legs of the animal 50 such that the feet of the animal 50 cannot pass through the loop. The animal 50 is thus secured to the rod 14 via the cord 22 and the stopper portion 18.

The method further includes inserting the rod 14 into the bore 38 of the barrel 30 through the muzzle 42, as seen in FIG. 2. The method may also include carrying the firearm 26 with the rod 14 in the bore 38 and the animal 50 secured to the rod 14 and stopper 18 via the cord 22 as seen in FIGS. 3 and 4. FIG. 3 depicts carrying the firearm 26 supported directly on a shoulder 54 of a human 58 carrying the firearm 26. The muzzle 42 is behind the human and, thus, the apparatus 10 and the animal 50 are also spaced a distance behind the human. The human may use a hand 62 to hold the firearm 26 forward of the shoulder 54 as necessary to limit movement of the firearm relative to the human 58.

In the embodiment depicted, the fore-end 66 of the firearm 26 is resting on the shoulder 54, such that the firearm 26 acts as a lever with the shoulder 54 as the fulcrum. The weight of the animal 50 exerts a downward force on the muzzle 42, which results in an upward force at the stock 70 or butt of the firearm 26; the human 58 exerts a downward force on the stock 70 or butt to counteract the upward force and thereby keep the muzzle 42 higher than the stock 62 to prevent the rod 14 from leaving the barrel 30.

FIG. 4 depicts carrying the firearm 26 via a strap 74 on the shoulder 54. Carrying the firearm 26 with the strap 74 on the shoulder is substantially identical to carrying the firearm 26 directly on the shoulder 54 except that, when using the strap 54, the firearm may be inverted or upside-down, i.e., the fore-end 66 faces upward. In the example shown in FIG. 4, the human 58 uses his or her hand 62 at the grip 78 to maintain the muzzle 42 elevated relative to the stock 70 and to otherwise keep the firearm steady.

The animal 50 depicted is a large game bird such as a turkey. It should be noted that the apparatus 10 may be employed with other game animals within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A method comprising:
   possessing a firearm having a barrel defining a bore and a muzzle;
   possessing an apparatus having a rod being sufficiently sized and shaped to be insertable into the bore of the barrel via the muzzle, a stopper portion operatively connected to the rod and having a width that is wider than the bore, and a cord being mounted to the rod and stopper such that, when the rod is inside the bore of the barrel, the cord is outside the bore;
   securing a harvested animal to the cord; and
   inserting the rod into the bore of the barrel through the muzzle.

2. The method of claim 1, further comprising carrying the firearm with the rod in the bore and the animal secured to the cord.

3. The method of claim 2, wherein said carrying the firearm includes supporting the firearm on a shoulder.

4. The method of claim 2, wherein the firearm has a strap attached thereto; and wherein said carrying the firearm includes supporting the strap on a shoulder.

* * * * *